(12) United States Patent
Eshghi et al.

(10) Patent No.: US 8,799,238 B2
(45) Date of Patent: Aug. 5, 2014

(54) DATA DEDUPLICATION (75) Inventors: Kave Eshghi, Los Alto, CA (US); Mark D. Lillibridge, Mountain View, CA (US); David M. Falkinder, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 26 days.

(21) Appl. No.: 13/634,757

(22) PCT Filed: Oct. 8, 2010

(86) PCT No.: PCT/US2010/051910
§ 371 (c)(1),
(2), (4) Date: Sep. 13, 2012

(87) PCT Pub. No.: WO2011/159322
PCT Pub. Date: Dec. 22, 2011

(65) Prior Publication Data
US 2013/0018855 A1 Jan. 17, 2013

Related U.S. Application Data (60) Provisional application No. 61/356,368, filed on Jun. 18, 2010.

(51) Int. Cl.
G06F 7/00 (2006.01)

(52) U.S. Cl.
USPC .......................................................... 707/692

(58) Field of Classification Search
USPC .......................................................... 707/692
See application file for complete search history.

(56) References Cited

U.S. PATENT DOCUMENTS

| | | |
|---|---|---|
| 2004/0133731 A1 | 7/2004 | Sorrentino et al. |
| 2005/0022204 A1 | 1/2005 | Kabir et al. |
| 2007/0250674 A1* | 10/2007 | Fineberg et al. .............. 711/162 |
| 2008/0294696 A1 | 11/2008 | Frandzel |

* cited by examiner

Primary Examiner — Truong Vo (57) ABSTRACT

A method for data deduplication includes receiving a set of hashes derived from a data chunk of a set of input data chunks 310. The method includes sampling the set of hashes 320, using an index indentifying data chunk containers that hold data chunks having a hash in the set of sampled hashes 330, and loading indexes for at least one of the identified data chunk containers 340. The method includes determining which of the hashes correspond to data chunks stored in data chunk containers corresponding to the loaded indexes 350 and deciding which of the set of input data chunks should be stored based at least in part on the determination.

15 Claims, 4 Drawing Sheets

DATA DEDUPLICATION

CROSS REFERENCE TO RELATED APPLICATIONS

The present application is related to and claims priority to U.S. Provisional Application Ser. No. 61/356,368, filed Jun. 18, 2010 which disclosure is incorporated herein by reference.

BACKGROUND

The storage of a computer may be backed up using a backup system. This may be done repeatedly over many days, with one backup taken per day so that data loss that is only discovered after a period of time has occurred can still be recovered. While some, backups may be "fulls", where a complete copy of the storage is made, others may be "incrementals", which save only files/sections that have been modified since the last backup. Although an incremental is not a complete copy of the storage, when combined with the last full and any incrementals in between, it can be used to restore the contents of the storage at the time the incremental was taken.

In order to reduce the amount of storage required by the backups, the backup system may deduplicate the backups. It may do this by breaking the backups into small pieces (~4-12 KB) called chunks and only keeping one copy of each unique chunk. By saving only the unique chunks plus backup recipes—instructions for reconstructing a backup from the set of unique chunks—the backup system can use orders of magnitude less storage to store any given set of backups.

When it comes time to retrieve a backup for use in restoring the computers storage, the various unique chunks making up that backup must be read and assembled in order. The speed of this process is heavily dependent with many modern storage technologies (e.g., hard disk drives) upon how fragmented the backup's chunks are. More precisely, every time the read process must switch to reading from a different part of the backup storage it may pay a random seek penalty (~10 ms with current drives). If there is no locality in where a backup's chunks are located (e.g., 76, 12, 34, 224, 103, 876 . . . rather than 76, 77, 78, 224, 225, 226, . . . ), then store speed may be quite slow.

Prior art stores new unique chunks sequentially. While this places all the new chunks from a given backup together, it does not place them next to the old chunks from that backup. If a backup is taken every day, then the data that was new on each day is located together. Unfortunately, many files such as log files and draft documents change a little bit each day, which results in their chunks being scattered across the backup system's storage. Sharing of chunks between different backups can also result in chunks being placed in a suboptimal location from the perspective of a given backup. Accordingly, many users complain that restoring a computer's storage from a deduplicated backup is a sluggish and time-consuming process.

DETAILED DESCRIPTION

Embodiments of the invention decrease the time required to reconstruct a deduplicated backup stored in a backup system. Embodiments of the invention employ chunk-based deduplication to reduce occurrence of storing more than one backup copy of the data chunks that constitute the stored backups. The system and accompanying methods make efficient use of computer processing and memory resources and have been shown to substantially reduce the number of times computer disk read heads must reposition themselves in order to acquire and assemble all of the portions of a backup located on one or more storage disks.

Although one or more embodiments of the invention are described in the context of being used as a backup system, it may be used for many other uses. More generally, it may be used as an efficient storage system that may store data objects, called items, of arbitrary size. Because they may be very large, items are usually streamed into one or more embodiments of the invention a bit at a time. The software that generates a backup for a computer may generate a number of virtual tape images (up to 4 GB) that together make up that backup; each virtual tape image may be a single item.

In chunk-based deduplication, an input data stream (or data input or item) is split into data chunks. A chunking algorithm is designed so that when a large enough sequence of bytes is shared by two regions of data, some of the chunks resulting from breaking up these regions are identical. When a new item is being ingested, the deduplication system tries to identify existing chunks in the store that are copies of the chunks that the new item is divided into. If such a chunk copy is identified, the system may avoid duplication by storing a reference to an existing copy of that chunk rather than storing the chunk again. Chunks for which no existing copy can be found are added to the chunk store.

Chunk fragmentation can result from the way new chunks are stored. The simplest scheme is to consider the chunk storage area to be a linear list of chunks; new chunks are then simply appended to the chunk storage area. The chunk storage area, in turn, is laid out sequentially on disk or a storage system, such as a number of disks used as a RAID group. This approach may be referred to as, the simple-append data chunk placement scheme. When the deduplication ratio is high, many of the new data's chunks already have existing copies in the store. These existing chunk copies potentially belong to many earlier items, each one of which has been received by the store at a different time. Since new chunks are laid out linearly, this means that the chunks constituting the new item can be far apart on disk. As a result, when it comes time to retrieve the item, the disk read head(s) will be forced to move all over to read those chunks, resulting in many seek operations. Since seeks are very slow compared to sequential read, this results, in very slow retrieval speed.

Figure 1:
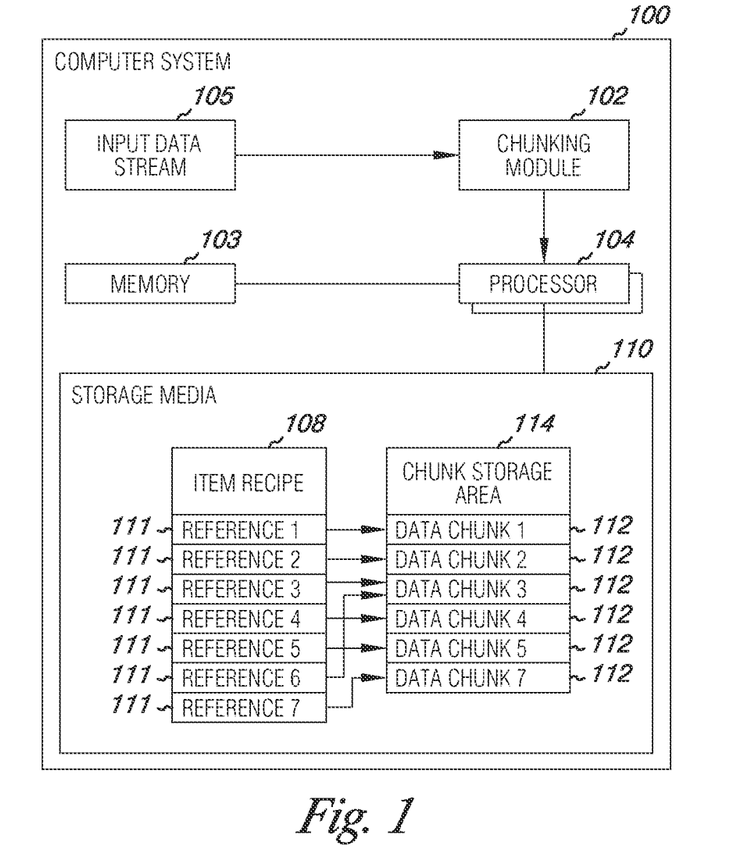
FIG. 1 is a block diagram showing a system using the simple-append algorithm for data chunk placement according to the prior art.

FIG. 1 is a block diagram showing, a system using the simple-append data chunk placement technique according to the prior art. FIG. 1 is a block diagram of an example computer system 100. The computer system 100 can be a single-node computer system, or a multi-node, distributed computer system.

The computer system 100 includes a chunking module 102 that receives an input data stream 105 for chunk-based deduplication. The chunking module 102 can be implemented as machine-readable instructions executable on one or multiple processors 104. The one or multiple processors 104 are connected to memory 103 (e.g., volatile memory) and storage media 110 (e.g., persistent storage media such as disk-based storage media or other types of storage media). The storage media 110 stores item recipes 108, which contain chunk references 111, and the chunk storage area 114. For the purposes of this example, each chunk reference 111 points to a data chunk 112 stored in the chunk storage area 114. In some other implementations, some or all of the content of the storage media 110 can be stored in a system separate from the computer system 100. Only one item recipe 108 is shown in FIG. 1; additional item recipes 108 will be created and stored as new items are received.

The memory 103 has faster access speed than the storage media 110, and can be used to temporarily store input data chunks.

The machine-readable instructions of the chunking module 102 are loaded for execution on a processor (such as 104). A processor can include a microprocessor, microcontroller, processor module or subsystem, programmable integrated circuit, programmable gate array, or another control or computing device.

Data and instructions are stored in respective storage devices, which are implemented as one or plural computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or computer-usable storage medium, or alternatively, can be provided on multiple computer-readable or computer-usable storage media distributed in a large system having possibly plural nodes. "Storage media" is intended to either a singular storage medium or plural storage media. Such computer-readable or computer-usable storage medium or media is (are) considered to be part of an article (or article of manufacture). An article or article of manufacture can refer to any manufactured single component or multiple components.

In FIG. 1, computer 100 receives input data stream 105 (e.g., a backup image) from an outside source or perhaps input data stream 105 results from the computer 100 selecting various foes for backup according to a predetermined back up schedule.

Further, computer 100 may represent a stand-alone computer server, or a cluster of such machines.

Processor 104 applies a chunking algorithm from the chunking algorithm module 102 to input data stream 105 to divide the data stream into data chunks. Here we assume the chunk storage area 114 is initially empty and that input data stream 5 is divided into the data chunks 1, 2, 3, 4, 5, 6, and 7, with every chunk being unique except that chunks 3 and 6 have the same contents. In the context of embodiments of the present invention, each data chunk may be between 2 and 12 kB in size, with an average-sized data chunk being approximately 4 kB. In the example of FIG. 1, data chunks 1, 2, 3, 4, 5, and 7 but not 6 (a copy of 3) are stored sequentially in chunk storage area 114, which may be stored on one or more hard disks or other mass storage devices. Item recipe 108 is created as input data stream 105 is ingested; it contains chunk references for the chunks of input data stream 105 (chunks 1, 2, 3, 4, 5, 6, and 7) in order. Note that the chunk references for chunks 3 and 6 both point to data chunk 3.

By way of example, and not by way of limitation, each data chunk (such as data chunks 112 shown in chunk storage area 114) is contemplated as being between 2 and 12 kB in size, with an average-sized data chunk being approximately 4 kB. Embodiments, however, are not so limited to this example. In the example of FIG. 1, data chunks 1, 2, 3, 4, 5, and 7 are stored sequentially in chunk storage area 114, which may be stored on one or more hard disks or other mass storage devices. It should be noted that input data stream 105 may include portions or complete copies of one or more individual computer files. Or it may include a series of database table rows. Thus, a group of data chunks from input data stream 105 may be a portion of a record of a business transaction while another portion of the input data stream may be portion of a marketing document produced by a completely separate business entity. There are no limits to the types of data being conveyed in input data stream 105.

In a typical prior art using the simple-append algorithm for data chunk placement, processor 104 applies the chunking algorithm from chunking module 102 to divide input stream 105 into a series of data chunks; it then determines if each data chunk has already been stored in chunk storage area 114. In the event that a data chunk is indeed already stored in chunk storage area 114, processor 104 discards that data chunk, adds the address of an existing copy of that data chunk (e.g., data chunk 3 for input chunk 6) to the end of item recipe 108, and considers the next data chunk. In the event that that data chunk has not already been stored in chunk storage area 114, processor 104 adds the new data chunk to the end of the chunk storage area 114 and adds the address of the newly stored data chunk to the end of item recipe 108. In this manner, the simple-append algorithm appends each unique data chunk to the chunk storage area 114, so data chunks are stored in the order they were first seen.

Additional new input data streams 105 may be considered by processor 104 for storage, resulting in new item recipes 108 (one per input data stream 105/item) and more unique data chunks 112 being stored in chunk storage area 114. The contents, of chunk storage area 114 may include unique data chunks 112 from thousands of items. As described before, this can result in a new input data stream 105 whose data chunks 112 are shared with many previous items having its data chunks 112 scattered across chunk storage a 114, resulting in slow restore speed.

Figure 2A:
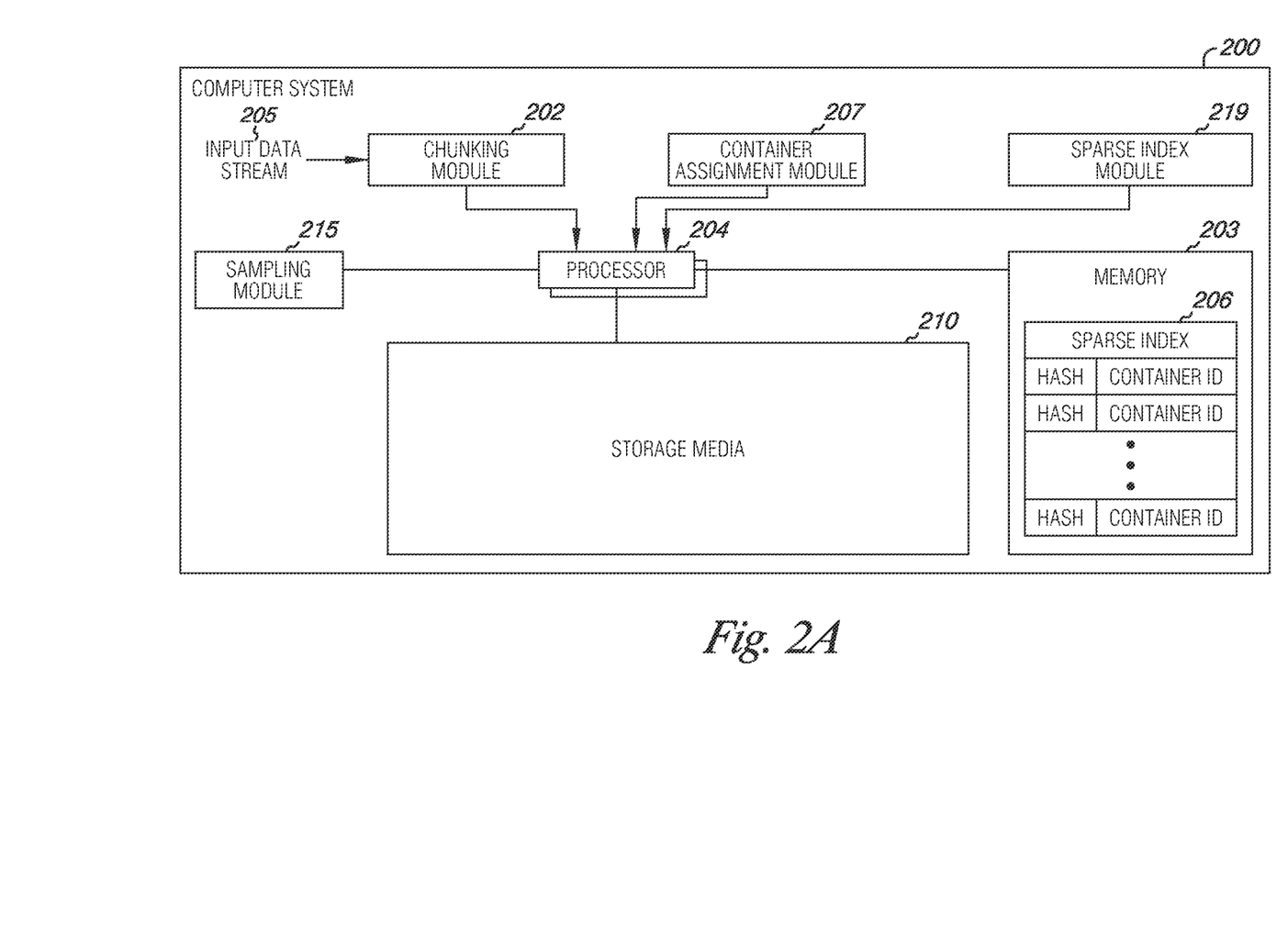
FIG. 2A is a block diagram showing a container-based algorithm for chunk-based deduplication system according to an example embodiment of the invention.

FIG. 2A is a block diagram showing functional elements of a container-based algorithm for chunk-based deduplication according to an embodiment of the invention. The inventors contemplate that a data chunk container is an on-disk data structure arranged within a small area of a mass storage disk or other mass storage device. In one embodiment of the invention, a data chunk container may be visualized as a that can be accessed and read in a time period on the order of one seek operation. The following terms illustrate building blocks for one or more embodiments of the invention.

A chunk container is an on-disk data structure that is used for storing chunks. The easiest way to visualize chunk containers is to consider each chunk container to be a file or a pair of files. As well as the chunk data, a container can contain other data about the chunks, such as reference counts for each chunk or a list of the chunks' hashes. In one embodiment, the chunk data as well as the extra metadata is contained in a single file. In another embodiment, the chunk data is contained in one file (called a chunk container data file) and the metadata is contained in a separate file (called a chunk container index file). However, embodiments are not so limited. In at least one embodiment, the containers are relatively small, so that the time it takes to access and read one container from disk is in the order of one seek operation.

A container ID is a small data value that uniquely identifies a container, and can be used for retrieving that container from disk.

A hook is the hash of an input data chunk that has been chosen by a sampling algorithm. In one embodiment the hashes, e.g., hashes of the data chunks in each item, are sampled using a sampling algorithm of the sampling module. For example, samples could be chosen for all the hashes whose first 7 bits are zero. These samples would be called hooks.

A container sparse index is an in-memory index that maps hooks to containers (possibly indirectly, such as via container IDs). The container sparse index maps the hooks to the chunk containers in which they occur. Note that the container sparse index and the chunk container index files, while both indexing containers, are otherwise unrelated data structures.

A segment is a continuous portion of the input data stream respecting chunk boundaries (e.g., a sequence of chunks $[c_1, c_2, \ldots, c_N]$). Although we will describe one or more embodiments of the invention as operating on the entire input data stream at once, in practice, one or more embodiments of the invention are often practiced by dividing up the input data stream into segments and then deduplicating one segment at a time.

FIG. 2A is a block diagram of an example computer system 200 in which one or more embodiments are incorporated. As before, the computer system 200 can be a single-node computer system, or a multi-node, distributed computer system.

The computer system 200 includes a chunking module 202 as well as a container assignment module 207, a sampling module 215, and a sparse index module 219 (described more in one or more embodiments below). The chunking module 202 as well as the container assignment module 207, the sampling module 215, and the sparse index module 219 can be implemented as machine-readable instructions executable on one or multiple processors 204. As the reader will appreciate, one or more of the above referenced modules can also be implemented as logic, e.g., hardware (HW), for performing a particular task or operation. The one or multiple processors 204 are connected to memory 203 (e.g., volatile memory) and storage media 210 (e.g., persistent storage media such as disk-based storage media or other types of storage media).

Figure 2B:
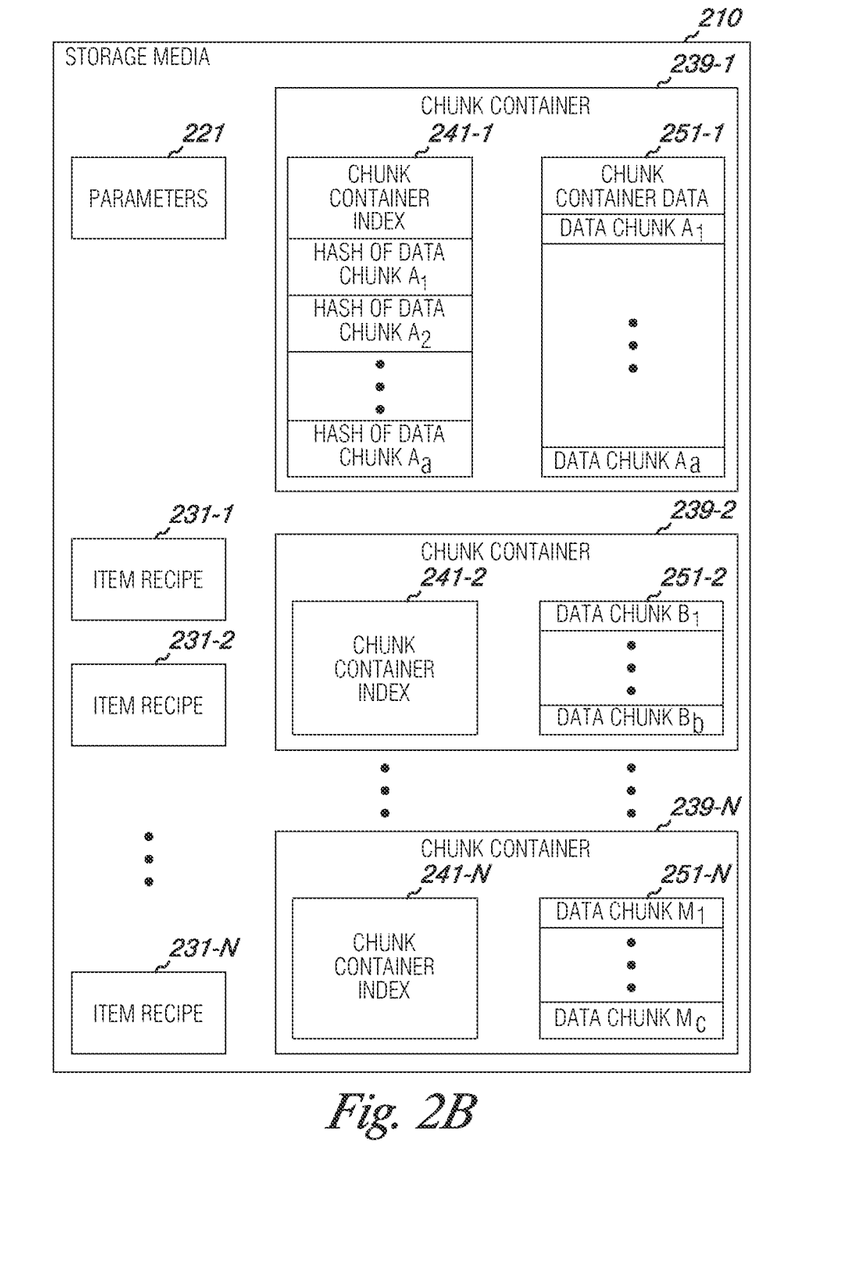
FIG. 2B is a block diagram showing in more detail one embodiment of storage media for container-based deduplication according to some example embodiments of the invention.

As shown in FIG. 2B, the storage media 210 stores item recipes 231-1, 231-2, . . . , 231-M, which contain chunk references (as described in connection with FIG. 1) and a number of chunk containers 239-1, 239-2, . . . , 239-N, each including a chunk container index (241-1, 241-2, . . . , 241-N respectively) and an associated chunk container data (251-1, 251-2, . . . , 251-N respectively). Chunk container index 241-1 is associated with and contains metadata for chunk container data 251-1, chunk container index 241-2 is associated with and contains metadata for chunk container data 251-2, and so on. In some embodiments, item recipes 231 may be stored using a two-level data structure where a top-level file points to a series of files called manifests that each contain the recipe for a portion of the item (e.g. a segment).

For the purposes of this example, each chunk container index 241-1, 241-2, . . . , 241-N contains a list of hashes, one for each of the chunks in its associated chunk container data.

This allows determining which chunks are present in the associated chunk container data using only the much smaller chunk container index. As described before, in some embodiments the chunk container data and its associated chunk container index are combined in a single data structure. Such a data structure shall also be called a chunk container index because it too allows determining which chunks that chunk container contains.

In some other implementations, some or all of the content of the storage media 110 can be stored in a system separate from the computer system 100. As shown in FIG. 2B, multiple item recipes 231-1, 231-2, . . . , 231-M will be created and stored as new items are received from input data stream 205. Storage media can also contain parameters 221. In some other implementations, some or all of the content of the storage media 210 can be stored in a system separate from the computer system 200.

As before, the memory 203 has faster access speed than the storage media 210, and can be used to temporarily store containers selected to store input data chunks.

The machine-readable instructions of the chunking module 202 as well as a container assignment module 207, a sampling module 215, and a sparse index module 219 are loaded for execution on the one or multiple processors (such as 204 in FIG. 2A).

Data and instructions are stored in storage, devices, which are implemented as one or plural computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that instructions can be provided on one computer-readable or computer-usable storage medium, or alternatively, can be provided on multiple computer-readable or computer-usable storage media distributed in a large system having possibly plural nodes. "Storage media" is intended to either a singular storage medium or plural storage media. Such computer-readable or computer-usable storage medium or media is (are) considered to be part of an article (or article of manufacture). An article or article of manufacture can refer to any manufactured single component or multiple components.

In FIG. 2A, computer 200 receives input data stream 205 from an outside source or perhaps has selected input data stream 205 for backup according to a predetermined backup schedule. The input data stream 205 is divided into smaller-sized data chunks. Again, by way of example and not by way of limitation, each data chunk is contemplated as being between 2 and 12 kB size, with an average-sized data chunk being approximately 4 kB. Embodiments, however, are not limited to this example. The one or multiple processors 204 can apply the chunking algorithm of chunking module 202 to divide the input data stream 205 into data chunks for storage in some of chunk containers 239-1, 239-2, . . . , 239-N and/or to be created chunk containers 239. The parsing may be performed by processor 204 of computer 200 or may be performed at a remote location many miles from computer 200.

As shown in the embodiment of FIG. 2B, chunk containers 239-1, 239-2, . . . , 239-N contain data chunks resulting from the backups of previously analyzed partitions of input data streams 205. By way of example, and not by way of limitation, in chunk container data 251-1, data chunk $A_1$ through data chunk $A_a$ are present. In chunk container data 251-2, data chunk $B_1$ through data chunk $B_b$ are present. In chunk container data 251-N, data chunk $M_1$ through data chunk $M_c$ are present. In FIG. 2B, additional data may also be included in each chunk container index such as a list of hashes of the data chunks located within the associated chunk container data, an offset for the starting address for each data chunk, and so forth.

As the input data 205 is received, the input data is divided by a chunking module 202 that applies a chunking technique. Examples of chunking techniques are described in Athicha Muthitacharoen et al., "A Low-Bandwidth Network File System," Proceedings of the $18^{th}$ (ACM) Symposium on Operating Systems Principles, pp. 174-187 (2001), and in U.S. Pat. No. 7,269,689.

For each data chunk that results from chunking the input data stream 205, processor 204, or perhaps a processor or other computing resource remotely located from computer 200, can perform a mathematical function to produce a hash for each data chunk. In some embodiments of the invention, processor 204 performs a hashing function such as MD5, SHA-1, multiplicative hashing, rotative hashing, or other suitable method. Embodiments, however, are not so limited.

Figure 3:
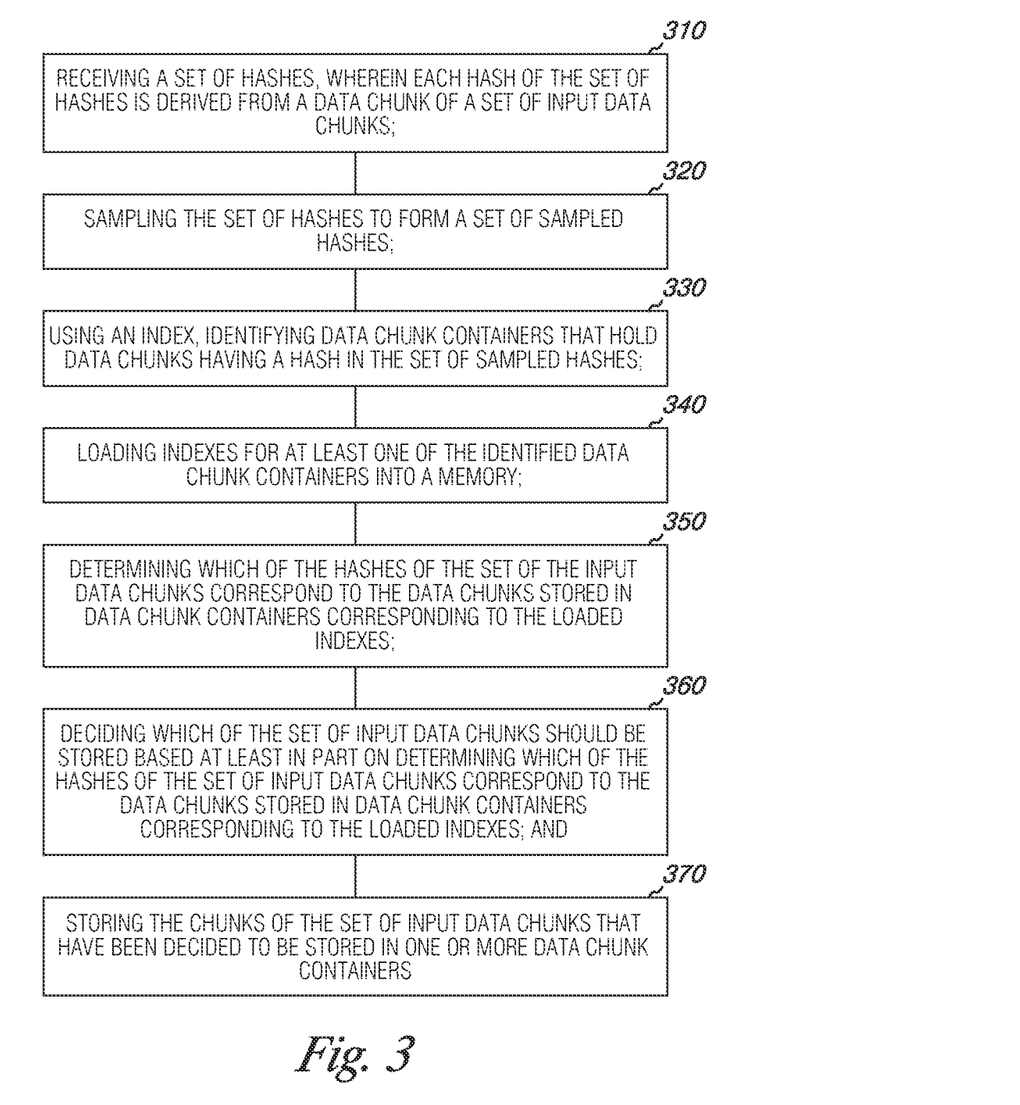
FIG. 3 is a flowchart for a method of container-based chunk-based deduplication according to example embodiments of the invention.

FIG. 3 is a flowchart for a method of computer chunk-based deduplication according to an embodiment of the invention. The method described in FIG. 3 can be implemented on a computer and/or backup system such as the system shown in FIGS. 2A and 2B. The system can be a single-node computer system, or a multi-node, distributed computer system. Such a system can include processor resources and memory resources (e.g., volatile memory and/or non-volatile memory) for executing instructions stored in a non-transitory computer-readable medium. Actions described herein can be performed by computer executable instructions stored in the memory resources and executed by the processor resources. In addition, actions can be implemented using hardware in the form of logic, including one or more application specific integrated circuits (ASICs).

In step 310, of FIG. 3 the method includes receiving a set of hashes where each hash of the set of hashes is derived from a data chunk of a set of input data chunks. As the reader will appreciate, in at least one embodiment an incoming data stream is partitioned into a set of incoming data chunks. If used in such an embodiment, the incoming data stream may be partitioned using a chunking module that resides on a different machine and is received from an external source, or may be an incoming data stream received from a source internal to that machine such as from a file backup operation of a stored computer program selected for backup according to a predetermined schedule. Data chunks resulting from the partitioning into data chunks process (called chunking) are analyzed to determine hashes that can be used to distinguish each data chunk from other data chunks. This analysis produces a set of hashes, each of which is derived from a data chunk of the set of input data chunks produced by chunking the input data stream. The set of hashes is received by the sampling module of computer system 200. If the chunking was done on a different machine, then this may require transmitting the set of hashes over a network.

As shown in block 320, the method includes sampling the set of hashes to form a set of sampled hashes, e.g., the hashes are sampled according to a sampling algorithm to produce a first set of hashes. By way of example, and not by way of limitation, only those hashes having the first five bits equal to 00000 are selected for further processing. In other embodiments of the invention, the hashes may be sampled according to any other criteria. Thus, nothing prevents sampling hashes in which the first five bits are equal to 11111, 010101, or any other combination. Further, although five bits have been chosen for this example, sampling according to the value of a fewer number of bits (such as 3) or a larger number of bits (such as) may be used.

As shown in block 330 the method includes by using an index, e.g., sparse index 206, identifying data chunk containers that hold data chunks having a hash in the set of sampled hashes. In other words, the data chunk containers arranged on a storage media device that hold data chunks having a hash contained in the set of sampled hashes are identified. In some cases, not all such containers may be identified. The containers may be identified in one embodiment by looking up each of the set of sampled hashes in turn in the sparse index 206; this results in a list of container IDs of containers known to contain at least one data chunk with a hash in the set of sampled hashes.

In block 340, the method includes loading indexes for at least one of the identified data chunk containers, into a memory. In one embodiment, the chunk container indexes for all the data chunk containers identified in step 330 are loaded into memory. In other embodiments, only some of the chunk container indexes for the data chunk containers identified in step 330 are loaded into memory. Which data chunk container, indexes to load may depend on how many data chunks whose hashes are in the set of sampled hashes each data chunk container is known to contain. By way of example and not by way of limitation, data chunk container 251-1 (of FIG. 2B) might include 10 data chunks having hashes contained in the set of sampled hashes. Additionally, data chunk container 251-2 might include 8 data chunks having hashes contained in the set of sampled hashes. Finally, data chunk container 251-N might include 2 data chunks having hashes contained in the set of sampled hashes and the other data chunk containers might contain no data chunks having hashes in the set of sampled hashes. Accordingly, only data chunk container indexes 241-1 and 241-2 might be selected for loading under a "load best 2 containers" policy. However, nothing prevents the loading of a larger number of data chunk container indexes (such as 5) or a smaller number of data chunk container indexes (such as 1 or fewer) for further analysis. Many other methods of choosing which of the identified data chunk containers' indexes to load are possible.

As shown in block 350, the method includes determining which of the hashes of the set of the input data chunks correspond to data chunks stored in data chunk containers corresponding to the loaded indexes. In one embodiment, this is done by testing each input data chunk's hash to see if it is contained in any of the loaded data chunk container indexes 241. If an input data chunk D has hash H and it is discovered that loaded data chunk container index 241-1 contains hash H, then it is known that chunk container data 251-1 (not necessarily loaded) contains a copy of input data chunk D.

As shown in block 360 the method includes deciding which of the set of input data chunks should be stored based at least in part on determining which of the hashes of the set of input data chunks correspond to the data chunks stored in data chunk containers corresponding to the loaded indexes. In one embodiment, a decision to store any input data chunk for which it was determined that its hash did not correspond to a data chunk stored in one of the data chunk containers corresponding to the loaded indexes is made. This corresponds to storing the data chunks for which there is not a known copy of in the data chunk containers whose indexes were loaded.

As shown in block 370, the method includes storing the chunks of the set of input data chunks that have been decided to be stored in one or more data chunk containers. In one embodiment, this may be done using the simple-append algorithm for data chunk placement.

In one or more embodiments the method further includes partitioning a portion of an input data stream into the set of input data chunks and determining a hash for each of the set of input data chunks prior to the receiving step to form the set of hashes. Embodiments, however, are not so limited. In one or more alternative embodiments, the method includes requesting the input data chunks that have been decided to be stored and receiving the input data chunks that have been decided to be stored. In at least one embodiment, the sparse index maps hashes of data chunks to sets of data chunk containers.

As the reader will appreciate, in one or more embodiments, the sparse index 206 records information only for hashes that have been sampled. In one or more embodiments, sampling the set of hashes to form the set of sample hashes 320 includes, in at least one embodiment, choosing, on average, less than one fourth of the hashes.

In one or more embodiments, deciding which of the set of input data chunks should be stored 360 includes deciding that an input data chuck should be stored if it is determined that the hash corresponding to the input data chunk is not included in the loaded indexes. Naturally, this includes deciding that an input data chuck should not be stored if it is determined that its hash is contained in the loaded indexes.

In one or more embodiments, deciding which of the set of input data chunks should be stored additionally includes using container capping to determine a first set of data chunk containers in which to store the set of input data chunks, as described above in copending, commonly assigned U.S. application Ser. No. 12/759,174, having common inventors, and filed on Apr. 13, 2010, (the same of which is incorporated in full by reference herewith) and deciding to store input data chunks that do not have copies already stored in the first set of data chunk containers 360. The first set of data chunk containers may contain only data chunk containers whose indexes have been loaded and data chunk containers that are currently open/are new.

Likewise, as the reader will appreciate, in one or more embodiments storing the data chunks of the set of, input data chunks 370 can include using a locality-based assignment algorithm to assign the input data chunks to be stored to data chunk containers, as described in commonly assigned, copending PCT application number US2007/022585, filed Oct. 25, 2007, and storing the input data chunks to be stored in assigned data chunk containers.

A locality-based assignment algorithm attempts to assign new chunks (i.e., chunks that have been decided to be stored in step 360) to existing chunk containers based in part on the chunk containers that contain the old chunks that they are near. For example, if a new chunk Z immediately follows the old chunk $A_1$ in the input data stream 205, a locality-based assignment algorithm may attempt to place chunk Z in the same chunk container that $A_1$ is known to be contained in (i.e., container 239-1). Such placement may not be possible if container 239-1 is full or does not have room for chunk Z. The locality-based assignment algorithm may take distances into account; for example in the stream . . . $B_3$ X Y Z V $A_1$ . . . , the algorithm may try to place Z in container 239-1 before container 239-2 because the old chunk $A_1$ from container 239-1 is closer to chunk Z than the old chunk $B_3$ from container 239-2.

The one or more embodiments of the invention described above can include at least three components: container-based deduplication (novel to the present disclosure), container capping (an example of which is describe in copending, commonly assigned U.S. application Ser. No. 12/759,174, having common inventorship herewith and filed Apr. 13, 2010), and locality-based chunk allocation (an example of which is describe in copending, commonly assigned PCT Application no. US2007/022585, filed Oct. 25, 2007).

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Various examples of the system and method for collaborative information services have been described in detail with reference to the drawings, where like reference numerals represent like parts and assemblies throughout the several views. Reference to various examples does not limit the scope of the system and method for displaying advertisements, which is limited just by the scope of the claims attached hereto. Additionally, any examples set forth in this specification are not intended to be limiting and merely set forth some of the many possible examples for the claimed system and method for collaborative information services.

Throughout the specification and claims, the meanings identified below do not necessarily limit the terms, but merely provide illustrative examples for the terms. The meaning of "a," "an," and "the" includes plural reference; and the meaning of "in" includes "in" and "on." The phrase "in an embodiment," used herein does not necessarily refer to the same embodiment, although it may.

In the foregoing Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for data deduplication, comprising:
  receiving a set of hashes, wherein each hash of the set of hashes is derived from a data chunk of a set of input data chunks;
  sampling the set of hashes based on a set value for each of a predetermined number of bits in a string of hash bits, to form a sampled set of hashes;

using an index, identifying data chunk containers that hold data chunks having a hash in the sampled set of hashes;
loading indexes having the sampled set of hashes for at least one of the identified data chunk containers into a memory;
determining which of the hashes in the set of the input data chunks correspond to the data chunks stored in data chunk containers corresponding to the loaded indexes;
deciding which of the set of input data chunks should be stored based at least in part on determining which of the hashes of the set of input data chunks correspond to the data chunks stored in data chunk containers corresponding to the loaded indexes; and
storing the chunks of the set of input data chunks that have been decided to be stored in one or more data chunk containers.

2. The method of claim 1, additionally comprising:
partitioning a portion of an input data stream into the set of input data chunks; and
determining a hash for each of the set of input data chunks prior to the receiving step to form the set of hashes.

3. The method of claim 1, additionally comprising:
requesting the input data chunks that have been decided to be stored; and
receiving the input data chunks that have been decided to be stored.

4. The method of claim 1 wherein the index maps hashes of data chunks to sets of data chunk containers records information only for hashes that have been sampled.

5. The method of claim 1 wherein the set of hashes to form a sampled set of hashes further comprises choosing, on average, less than one fourth of the hashes.

6. The method of claim 1 wherein deciding which of the set of input data chunks should be stored further comprises deciding that an input data chunk should be stored if it is determined that the hash corresponding to the input data chunk is not included in the loaded indexes.

7. The method of claim 6 wherein the step of deciding which of the set of input data chunks should be stored additionally comprises deciding that an input data chunk should not be stored if it is determined that its hash is contained in the loaded indexes.

8. The method of claim 6 wherein deciding which of the set of input data chunks should be stored additionally comprises;
using container capping to determine a first set of data chunk containers in which to store the set of input data chunks; and
deciding to store input data chunks that do not have copies already stored in the first set of data chunk containers.

9. The method of claim 1 wherein storing the data chunks of the set of input data chunks comprises:
using a locality based assignment algorithm to assign the input data chunks to be stored to data chunk containers; and
storing the input data chunks to be stored in assigned data chunk containers.

10. A system for performing data deduplication, comprising:
a sampling module that samples a set of hashes based on a set value for each of a predetermined number of bits in a string of hash bits to form a sampled set of hashes corresponding to hashes sampled from data chunks of a data stream;
one or more chunk container indexes that identify data chunk containers that hold data chunks having a hash in the sampled set of hashes;
logic for loading indexes having the sampled set of hashes for at least one of the identified data chunk containers into a memory;
logic for determining which of the hashes of the set of the input data chunks correspond to data chunks stored in data chunk containers corresponding to the loaded indexes; and
logic for deciding which of the set of input data chunks should be stored based at least in part on determining which of the hashes of the set of input data chunks correspond to the data chunks stored in data chunk containers corresponding to the loaded indexes.

11. The system of claim 10, further comprising logic for storing the data chunks of the set of input data chunks that have been decided to be stored in one or more data chunk containers.

12. The system of claim 10, further comprising logic for sampling hashes of the data chunks stored in data chunk containers arranged on the storage media.

13. The system of claim 10, further comprising logic for deciding which of the set of input data chunks should be stored additionally based on;
container capping information to determine a first set of data chunk containers in which to store the set of input data chunks; and
that stores input data chunks based on determining that input data chunks do not have copies already stored in the first set of data chunk containers.

14. The system of claim 10, further comprising logic for storing the data chunks of the set of input data chunks based on:
locality based assignment information that assigns the input data chunks to be stored to data chunk containers; and
that stores the input data chunks to be stored in assigned data chunk containers.

15. A non-transitory computer-readable medium having computer executable instructions store thereon that are executed by a processor to:
sample a set of hashes based on a set value for each of a predetermined number of bits in a string of hash bits, wherein each hash of the set of hashes is derived from a data chunk of a set of input data chunks, to form a sampled set of hashes;
use an index to identify data chunk containers that hold data chunks having a hash in the sampled set of hashes;
load indexes having the sampled set of hashes for at least one of the identified data chunk containers into a memory;
determining which of the hashes of the set of the input data chunks correspond to the data chunks stored in data chunk containers corresponding to the loaded indexes; and
decide which of the set of input data chunks should be stored based at least in part on determining which of the hashes of the set of input data chunks correspond to the data chunks stored in data chunk containers corresponding to the loaded indexes.

* * * * *